March 3, 1936.  H. G. ROSS  2,032,634
HUMIDIFIER
Filed Aug. 19, 1933
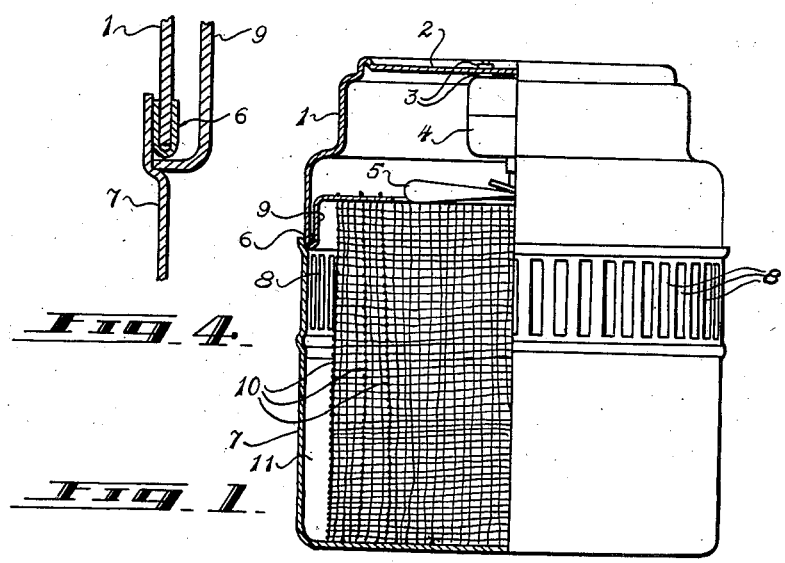
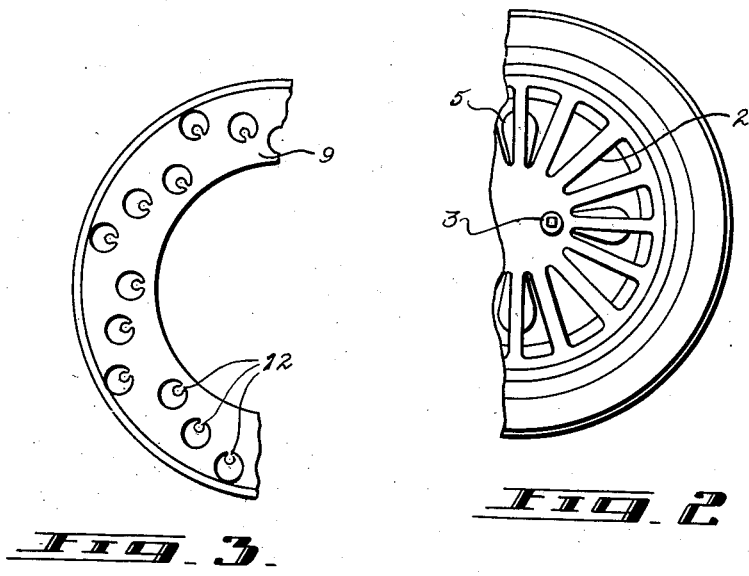
INVENTOR
Hugh G. Ross
BY
ATTORNEY

UNITED STATES PATENT OFFICE 2,032,634

HUMIDIFIER

Hugh G. Ross, Ottawa, Ontario, Canada

Application August 19, 1933, Serial No. 685,935
In Canada May 3, 1933

6 Claims. (Cl. 261—107)

My invention relates to the design of a humidifier for increasing the moisture content of dry air in homes, offices or other buildings. The purpose of my invention is to provide an extremely simple yet effective design of humidifier which is portable, requires no installation, and is inexpensive both with regard to initial and operating cost. Further object is to provide means whereby the water-absorbent humidifying element, while being disposed to best advantage, may be easily and periodically removed, cleansed, and replaced. It is also an object of my design to prevent the electric motor from being subject to out-going moist air; and to further provide against wetting the motor, by having it completely removed when the reservoir is being filled.

The objects and advantages of the invention will be apparent from the following specifications.

In the drawing illustrating a preferred form of my invention:—

Figure 1 shows an assembled view of the complete humidifier with part of casing cut away to show the motor, fan and humidifying element;

Figure 2 shows a top plan view of the complete humidifier;

Figure 3 is a top plan view of the rack which supports the humidifying element; and Figure 4 shows an enlarged cross-sectional view of the juncture of the two shells and the rack which supports the humidifying elements.

Referring more particularly to the drawing, 1 is the upper shell which may be drawn or spun in one piece and which is perforated as shown at 2 to provide a grill through which air may pass. Further perforations are provided at the centre of this shell for securing thereto the motor and fan assembly 4 and 5 which in my preferred form is mounted by bolting through rubber washers 3 to the shell. This provides a resilient mounting which absorbs vibration and prevents transmission of motor noise. To ensure a tight non-rattling fit between shell 1 and bottom shell 7, a rubber ring 6 may be cemented or otherwise fastened around the periphery of shell 1 as shown.

The lower shell 7 may be drawn or spun in one piece, and perforated as shown at 8 to provide a grill through which air may pass. An offset shoulder is provided just above the grill at the periphery of shell 7 to form a support for shell 1. An annular bead is provided in a corresponding position below the grill to strengthen the shell and to mark the level to which the shell may be filled with water.

The humidifying element consists of a rack 9 and depending wicks 10. The rack 9 may be drawn or spun in one piece and has a large hole in the centre below the fan 5. Sets of holes at different radii are provided to form the lugs 12 onto which the wicks are hooked so that they hang concentrically. The wicks 10 are of a water absorbent open-mesh material and are long enough so that the bottom part of the depending wick is always in the water 11. Due to capillary action, all or the greater part of the wicks become moistened and offers a relatively large wetted surface to the air which is being circulated through them by the fan 5.

I prefer that the fan 5 draw the air in through grill 2 and discharge it through grill 8, because the moistened air does not thus come in contact with the motor. However, as a humidifier, my design would work just as well if the air were to enter at grill 8 and discharge through grill 2.

In the preferred form illustrated, the wicking 10 consists of three separate pieces, the longest of which is hooked to the set of lugs at the greatest radius, the second longest of which is hooked to the set of lugs at the mean radius and the shortest of which is hooked to the inner set of lugs. It is obvious that I might employ a larger or smaller number of wicks so long as I provide a corresponding number of sets of hooks. The result I desire is that each wick forms a complete enclosure and with a space between each two wicks thus forcing the air to pass through each wick in turn as it is circulated through the humidifier by the fan 5.

From the foregoing description taken in connection with the accompanying drawing, it will be manifest that a humidifier is provided which will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what I claim as new and desire to secure by Letters Patent is:—

1. In a humidifier, two shells each being perforated in part to form an air grill, a motor-driven fan resiliently suspended from the upper shell for passing air through the housing formed by fitting the two shells together, an annular rack supported at the juncture of said shells, and water-absorbent wicks suspended from said rack to form a concentric wall through which a draft created by said fan must pass.

2. A humidifier comprising a lower water containing shell flanged at the top; an upper fan carrying shell resting on said flange and an annular wick suspending rack supported on said lower shell and upwardly offset to extend into said upper shell.

3. A humidifier comprising a cylindrical water containing housing formed of complementary upper and lower shells, a motor fan assembly resiliently suspended in said housing from said upper shell, a removable rack supported on said lower shell and extending upwardly to surround said fan; and wicks hanging from said rack concentric with said fan.

4. A humidifier comprising a cylindrical water containing housing formed of complementary upper and lower shells; a motor fan assembly resiliently suspended in said housing from said upper shell; a removable wick suspending rack supported on said lower shell and held in place by said upper shell.

5. A humidifier comprising a cylindrical water containing housing formed of complementary upper and lower shells; the upper rim of said lower shell being flanged outwardly to telescopically receive said upper shell; and a wick suspending rack removably supported on said flange and on which said upper shell rests.

6. A humidifier comprising a cylindrical water containing housing formed of complementary upper and lower shells; the upper rim on said lower shell being flanged outwardly to telescopically receive said upper shell; an annular rack removably supported on said flange having a wide upwardly offset inner rim and staggered concentric rows of wick attaching means on said upwardly offset rim.

HUGH G. ROSS.